US010715634B2

(12) United States Patent
Solis et al.

(10) Patent No.: US 10,715,634 B2
(45) Date of Patent: *Jul. 14, 2020

(54) SYSTEM AND METHOD FOR CREATING VIRTUAL INTERFACES BASED ON NETWORK CHARACTERISTICS

(71) Applicant: Cisco Technology, Inc., San Jose, CA (US)

(72) Inventors: Ignacio Solis, South San Francisco, CA (US); Glenn C. Scott, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 16/038,255

(22) Filed: Jul. 18, 2018

(65) Prior Publication Data

US 2018/0324280 A1 Nov. 8, 2018

Related U.S. Application Data

(63) Continuation of application No. 14/522,479, filed on Oct. 23, 2014, now Pat. No. 10,069,933.

(51) Int. Cl.
*H04L 12/24* (2006.01)
*H04W 84/18* (2009.01)
(Continued)

(52) U.S. Cl.
CPC ........ *H04L 67/327* (2013.01); *H04L 41/0893* (2013.01); *H04L 41/12* (2013.01);
(Continued)

(58) Field of Classification Search
CPC ... H04L 67/327; H04L 41/0893; H04L 41/12; H04L 43/0876; H04L 45/38; H04W 84/18
(Continued)

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| CN | 103873371 | 6/2014 |
| DE | 1720277 A1 | 6/1967 |

(Continued)

OTHER PUBLICATIONS

Configuring Cisco Discovery; Cisco; Nov. 21, 2006, Cisco, (6 pages).

(Continued)

*Primary Examiner* — Sm A Rahman
*Assistant Examiner* — Chen-Liang Huang

(57) ABSTRACT

A network-configuring system creates stable virtual interfaces for groups of neighboring network nodes. During operation, the system can obtain network-neighborhood information from one or more network neighbors. This network-neighborhood information includes duplex-neighborhood information that indicates at least a set of neighboring devices to the network neighbor, and a set of remote network nodes which are accessible via a respective neighbor. The system can use the network-neighborhood information to determine one or more groups of network neighbors with common network characteristics, such that a respective group includes one or more mutually-connected network peers. The system can then define a virtual interface for a respective group of stable network neighbors, such that the virtual interface's member nodes include the local network node and the respective group's mutually-connected network peers.

20 Claims, 10 Drawing Sheets

(51) Int. Cl.
*H04L 29/08* (2006.01)
*H04L 12/26* (2006.01)
*H04L 12/721* (2013.01)

(52) U.S. Cl.
CPC .......... *H04L 43/0876* (2013.01); *H04L 45/38* (2013.01); *H04W 84/18* (2013.01)

(58) Field of Classification Search
USPC ...................................................... 709/224
See application file for complete search history.

(56) References Cited

U.S. PATENT DOCUMENTS

| | | | |
|---|---|---|---|
| 4,921,898 | A | 5/1990 | Lenney |
| 5,070,134 | A | 12/1991 | Oyamada |
| 5,110,856 | A | 5/1992 | Oyamada |
| 5,214,702 | A | 5/1993 | Fischer |
| 5,377,354 | A | 12/1994 | Scannell |
| 5,506,844 | A | 4/1996 | Rao |
| 5,629,370 | A | 5/1997 | Freidzon |
| 5,845,207 | A | 12/1998 | Amin |
| 5,870,605 | A | 2/1999 | Bracho |
| 6,047,331 | A | 4/2000 | Medard |
| 6,052,683 | A | 4/2000 | Irwin |
| 6,085,320 | A | 7/2000 | Kaliski, Jr. |
| 6,091,724 | A | 7/2000 | Chandra |
| 6,128,623 | A | 10/2000 | Mattis |
| 6,128,627 | A | 10/2000 | Mattis |
| 6,173,364 | B1 | 1/2001 | Zenchelsky |
| 6,209,003 | B1 | 3/2001 | Mattis |
| 6,226,618 | B1 | 5/2001 | Downs |
| 6,233,617 | B1 | 5/2001 | Rothwein |
| 6,233,646 | B1 | 5/2001 | Hahm |
| 6,289,358 | B1 | 9/2001 | Mattis |
| 6,292,880 | B1 | 9/2001 | Mattis |
| 6,332,158 | B1 | 12/2001 | Risley |
| 6,363,067 | B1 | 3/2002 | Chung |
| 6,366,988 | B1 | 4/2002 | Skiba |
| 6,574,377 | B1 | 6/2003 | Cahill |
| 6,654,792 | B1 | 11/2003 | Verma |
| 6,667,957 | B1 | 12/2003 | Corson |
| 6,681,220 | B1 | 1/2004 | Kaplan |
| 6,681,326 | B2 | 1/2004 | Son |
| 6,732,273 | B1 | 5/2004 | Byers |
| 6,769,066 | B1 | 7/2004 | Botros |
| 6,772,333 | B1 | 8/2004 | Brendel |
| 6,775,258 | B1 | 8/2004 | vanValkenburg |
| 6,862,280 | B1 | 3/2005 | Bertagna |
| 6,901,452 | B1 | 5/2005 | Bertagna |
| 6,915,307 | B1 | 7/2005 | Mattis |
| 6,917,985 | B2 | 7/2005 | Madruga |
| 6,957,228 | B1 | 10/2005 | Graser |
| 6,968,393 | B1 | 11/2005 | Chen |
| 6,981,029 | B1 | 12/2005 | Menditto |
| 7,007,024 | B2 | 2/2006 | Zelenka |
| 7,013,389 | B1 | 3/2006 | Srivastava |
| 7,031,308 | B2 | 4/2006 | Garcia-Luna-Aceves |
| 7,043,637 | B2 | 5/2006 | Bolosky |
| 7,061,877 | B1 | 6/2006 | Gummalla |
| 7,080,073 | B1 | 7/2006 | Jiang |
| RE39,360 | E | 10/2006 | Aziz |
| 7,149,750 | B2 | 12/2006 | Chadwick |
| 7,152,094 | B1 | 12/2006 | Jannu |
| 7,177,646 | B2 | 2/2007 | ONeill |
| 7,206,860 | B2 | 4/2007 | Murakami |
| 7,206,861 | B1 | 4/2007 | Callon |
| 7,210,326 | B2 | 5/2007 | Kawamoto |
| 7,246,159 | B2 | 7/2007 | Aggarwal |
| 7,257,837 | B2 | 8/2007 | Xu |
| 7,287,275 | B2 | 10/2007 | Moskowitz |
| 7,315,541 | B1 | 1/2008 | Housel |
| 7,339,929 | B2 | 3/2008 | Zelig |
| 7,350,229 | B1 | 3/2008 | Lander |
| 7,362,727 | B1 | 4/2008 | ONeill |
| 7,382,767 | B2 | 6/2008 | Barnes |
| 7,395,507 | B2 | 7/2008 | Robarts |
| 7,430,755 | B1 | 9/2008 | Hughes |
| 7,444,251 | B2 | 10/2008 | Nikovski |
| 7,466,703 | B1 | 12/2008 | Arunachalam |
| 7,472,422 | B1 | 12/2008 | Agbabian |
| 7,496,668 | B2 | 2/2009 | Hawkinson |
| 7,509,425 | B1 | 3/2009 | Rosenberg |
| 7,523,016 | B1 | 4/2009 | Surdulescu |
| 7,542,471 | B2 | 6/2009 | Samuels |
| 7,543,064 | B2 | 6/2009 | Juncker |
| 7,552,233 | B2 | 6/2009 | Raju |
| 7,555,482 | B2 | 6/2009 | Korkus |
| 7,555,563 | B2 | 6/2009 | Ott |
| 7,564,812 | B1 | 7/2009 | Elliott |
| 7,567,547 | B2 | 7/2009 | Mosko |
| 7,567,946 | B2 | 7/2009 | Andreoli |
| 7,580,971 | B1 | 8/2009 | Gollapudi |
| 7,623,535 | B2 | 11/2009 | Guichard |
| 7,636,767 | B2 | 12/2009 | Lev-Ran |
| 7,647,507 | B1 | 1/2010 | Feng |
| 7,660,324 | B2 | 2/2010 | Oguchi |
| 7,685,290 | B2 | 3/2010 | Satapati |
| 7,698,463 | B2 | 4/2010 | Ogier |
| 7,698,559 | B1 | 4/2010 | Chaudhury |
| 7,769,887 | B1 | 8/2010 | Bhattacharyya |
| 7,779,467 | B2 | 8/2010 | Choi |
| 7,801,069 | B2 | 9/2010 | Cheung |
| 7,801,177 | B2 | 9/2010 | Luss |
| 7,816,441 | B2 | 10/2010 | Oihana Elizalde |
| 7,831,733 | B2 | 11/2010 | Sultan |
| 7,873,619 | B1 | 1/2011 | Faibish |
| 7,908,337 | B2 | 3/2011 | Garcia-Luna-Aceves |
| 7,924,837 | B1 | 4/2011 | Shabtay |
| 7,953,014 | B2 | 5/2011 | Toda |
| 7,953,885 | B1 | 5/2011 | Devireddy |
| 7,979,912 | B1 | 7/2011 | Roka |
| 8,000,267 | B2 | 8/2011 | Solis |
| 8,010,691 | B2 | 8/2011 | Kollmansberger |
| 8,069,023 | B1 | 11/2011 | Frailong |
| 8,074,289 | B1 | 12/2011 | Carpentier |
| 8,117,441 | B2 | 2/2012 | Kurien |
| 8,160,069 | B2 | 4/2012 | Jacobson |
| 8,204,060 | B2 | 6/2012 | Jacobson |
| 8,214,364 | B2 | 7/2012 | Bigus |
| 8,224,985 | B2 | 7/2012 | Takeda |
| 8,225,057 | B1 | 7/2012 | Zheng |
| 8,271,578 | B2 | 9/2012 | Sheffi |
| 8,271,687 | B2 | 9/2012 | Turner |
| 8,312,064 | B1 | 11/2012 | Gauvin |
| 8,332,357 | B1 | 12/2012 | Chung |
| 8,386,622 | B2 | 2/2013 | Jacobson |
| 8,447,851 | B1 | 5/2013 | Anderson |
| 8,462,781 | B2 | 6/2013 | McGhee |
| 8,467,297 | B2 | 6/2013 | Liu |
| 8,473,633 | B2 | 6/2013 | Eardley |
| 8,553,562 | B2 | 10/2013 | Allan |
| 8,572,214 | B2 | 10/2013 | Garcia-Luna-Aceves |
| 8,654,649 | B2 | 2/2014 | Vasseur |
| 8,665,757 | B2 | 3/2014 | Kling |
| 8,667,172 | B2 | 3/2014 | Ravindran |
| 8,677,451 | B1 | 3/2014 | Bhimaraju |
| 8,688,619 | B1 | 4/2014 | Ezick |
| 8,699,350 | B1 | 4/2014 | Kumar |
| 8,718,055 | B2 | 5/2014 | Vasseur |
| 8,750,820 | B2 | 6/2014 | Allan |
| 8,761,022 | B2 | 6/2014 | Chiabaut |
| 8,762,477 | B2 | 6/2014 | Xie |
| 8,762,570 | B2 | 6/2014 | Qian |
| 8,762,707 | B2 | 6/2014 | Killian |
| 8,767,627 | B2 | 7/2014 | Ezure |
| 8,817,594 | B2 | 8/2014 | Gero |
| 8,826,381 | B2 | 9/2014 | Kim |
| 8,832,302 | B1 | 9/2014 | Bradford |
| 8,836,536 | B2 | 9/2014 | Marwah |
| 8,861,356 | B2 | 10/2014 | Kozat |
| 8,862,774 | B2 | 10/2014 | Vasseur |
| 8,868,779 | B2 | 10/2014 | ONeill |
| 8,874,842 | B1 | 10/2014 | Kimmel |
| 8,880,682 | B2 | 11/2014 | Bishop |

(56) References Cited

U.S. PATENT DOCUMENTS

| | | |
|---|---|---|
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,379,979 B2 | 6/2016 | Solis |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Paterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0061427 A1 | 3/2007 | Vishnia-Shabtai et al. |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |

(56) References Cited

U.S. PATENT DOCUMENTS

| | | |
|---|---|---|
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatiey |
| 2009/0157887 A1 | 6/2009 | Froment |
| 2009/0161578 A1 | 6/2009 | Yeung et al. |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson et al. |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2011/0307496 A1* | 12/2011 | Jones .............. G06F 16/24 707/748 |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0144416 A1* | 6/2012 | Wetzer ........ H04N 21/25816 725/14 |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0254910 A1* | 10/2012 | Donoghue ............ H04H 60/31 725/14 |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |

(56) References Cited

U.S. PATENT DOCUMENTS

| | | |
|---|---|---|
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110921 A1* | 5/2013 | Logan ............... H04N 21/4788 709/204 |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0170490 A1 | 7/2013 | Kreeger et al. |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0280934 A1 | 9/2014 | Reagan et al. |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2014/0372654 A1 | 12/2014 | Pelt et al. |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0119251 A1 | 4/2016 | Solis et al. |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |

(56) References Cited

FOREIGN PATENT DOCUMENTS

| | | |
|---|---|---|
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2894812 A1 | 7/2015 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011049690 A1 | 4/2011 |
| WO | 2012077073 A1 | 6/2012 |
| WO | 2013123410 | 8/2013 |
| WO | 2015084327 | 6/2015 |

OTHER PUBLICATIONS

CDP Basics; Kelson Lawrence, Feb. 13, 2013; (8 pages).
Boneh, et al., "Collusion Resistant Broadcast Encryption with Short Ciphertexts and Private Keys," Advances in Cryptology—CRYPTO 2005, Aug. 2005, 19 pages.
Xiong, et al., "CloudSeal: End-to-End Content Protection in Cloud-Based Storage and Delivery Services," SecureComm 2011: Security and Privacy in Communication Networks, Sep. 2011, 10 pages.
Ateniese, et al., "Improved Proxy Re-encryption Schemes with Applications to Secure Distributed Storage," ACM Transactions on Information and System Security (TISSEC), vol. 9 Issue 1, Feb. 2006, 30 pages.
Biradar, et al., "Review of Multicast Routing Mechanisms in Mobile Ad Hoc Networks," Journal of network and Computer Applications, vol. 35, Issue 1, Jan. 2012, 19 pages.
Lynn, "PBC Library—Pairing-Based Cryptography," retrieved from https://crypto.standford.edu/pbc/, on Apr. 27, 2015, 2 pages.
Google Code Archive, "CCNX-Trace," https://code.google.com/archive/p/ccnx-trace/, project created on Jul. 23, 2012, retrieved on Mar. 30, 2018, 2 pages.
Extended European Search Report and Written Opinion in counterpart European Application No. 15189861.6, dated Mar. 18, 2016, 8 pages.
Angius, et al., "BLOOGO—BLOOm filter based GOssip algorithm for wireless NDN," NoM'12, Jun. 2012, 7 pages.
Xie et al. "Collaborative Forwarding and Caching in Content Centric Networks", Networking 2012.
Lui et al. (A TLV Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.

Marc Mosko. "CCNx 1.0 Protocol Introduction" Apr. 2, 2014 [Retrieved from the Internet Aug. 6, 2016] http://www.ccnx.org/pubs/hhg/1.1%20CCNx%201.0%20Protocol%20Introduction.pdf paragraphs [01.3], [002], [02.1], [003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303. Paragraph [002] figure 1.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Aug. 6, 2016] paragraphs [003]-[006], [0011], [0013]figures 1.2.
Marc Mosko et al "All-In-One Streams for Content Centric Networks", May 24, 2015, retrieved from the Internet: http://www.ccnx.org/pubs/AllinOne.pdf [downloaded Sep. 6, 2016]*the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf p. 5, col. 1 p. 2, col. 1-2 Section 4.1; p. 4, col. 2 Section 4.2; p. 4, col. 2.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology. Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Ao-Jan Su, David R. Choffnes, Aleksandar Kuzmanovic, and Fabian E. Bustamante. Drafting Behind Akamai; Inferring Network Conditions Based on CDN Redirections. IEEE/ACM Transactions on Networking [Feb. 2009).
B. Lynn$2E.
C. Gentry and A. Silverberg. Hierarchical ID-Based Cryptography. Advances in Cryptology—ASIACRYPT 2002. Springer Berlin Heidelberg (2002).
D. Boneh, C. Gentry, and B. Waters, 'Collusi.
D. Boneh and M. Franklin. Identity-Based Encryption from the Well Pairing. Advances in Cryptology—CRYPTO 2001, vol. 2139, Springer Berlin Heidelberg (2001).
G. Ateniese, K. Fu, M. Green, and S. Hohenberger. Improved Proxy Reencryption Schemes with Applications to Secure Distributed Storage. In the 12th Annual Network and Distributed System Security Sympo.
H. Xiong, X. Zhang, W. Zhu, and D. Yao. CloudSeal: End-to$2.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digital Rights Management using Broadcast Encryption. Proceedings of the IEEE 92.6 (2004).

(56) References Cited

OTHER PUBLICATIONS

J. Shao and Z. Cao. CCA-Secure Proxy Re-Encryption without Pairings. Public Key Cryptography. Springer Lecture Notes in Computer Science vol. 5443 (2009).
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
HTMP (2009). Available online at http://wwwimages.adobe.com/www.adobe.com/content/dam/Adobe/en/devnet/rtmp/pdf/rtmp specification 1.0.pdf.
S. Chow, J. Weng, Y. Yang, and R. Deng. Efficient Unidirectional Proxy Re-Encryption Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOVOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/, downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching." ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survery of Information-centric Networking' IEEE Commun. Magazine, Jul. 2012, pp. 26-36.
Bari, MdFaizul, et al. 'A survery of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho. Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDos attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam. Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_ J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of Termination Detection Algorithm for Distributed Computations," Information Processing Letter, vol. 16, No. 5, 1983.
Fayazbakhsh, S. K., Lin, Y, Toontoonchian, A., Ghodsi, A., Koponen, T., Maggs, B., & Shenker, S. (Aug. 2013). Less pain, most of the gain: Incrementally deployable ICN. In ACM SIGCOMM Computer Communication Review (vol. 43, No. 4, pp. 147-158), ACM.
G. Tyson, S. Kaune, S. Miles, Y. El-Khatib, A. Mauthe, and A. Taweel. "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.

(56) References Cited

OTHER PUBLICATIONS

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun, "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Charlerrnek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference on International Buildng Performance Simulation Association. 2011.
K. Liang, L. Fang, W. Susilo, and D.S. Wong, "A Ciphertext-policy attribute-based proxy re-encryption with chosen-ciphertext security," In Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.

Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens. "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on IEEE, 2010.
Lopez, Javier, et al. "Trust management systems for wireless sensor networks: Best practices." Computer Communications 33.9 (2010): 1086-1093.
M. Green and G. Ateniese, "Indentity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal informational exchange syntax v. 1.1," IETF RFC 7292, K. Moriarty, Ed., Jul. 2014.
M. Parsa and J.J. Garcia-Luna-Aceves. "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E. Uzun, S. Sevilla, and J. Garcia-Luna-Aceves, "CCN-krs: A key resolution service for con," in Proceedings of the 1st International Conference on Information-centric Networking. Ser. INC 14 New York, NY, USA: ACM, 2014, pp. 97-106 [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASIER: Encryption-based access control in social network with efficient revocation," in Proc. ACM ASIACCS 2011, Hong Kong, China, Mar. 2011, pp. 411-415.

(56) References Cited

OTHER PUBLICATIONS

S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Derministic and Updatable Hashing for High Performance Networking," 2008, pp. 556-564.
S. Misra, R. Tourani, and N.E. Majd, "Secure content delivery in information-centric networks: Design, Implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wirelss Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce. [Technology Administration]. National Institute of Standards and Technlogy, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Varma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng, and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56 . . . .
Xylomenos, George, et al. "A survey of information-centric networking research." Communications Surveys & Tutorials, IEEE 16.2 (2014): 1024-1049.
Yi, Cheng, et al. 'A case for stateful forwarding plane.'0 Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 (2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama. "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug, 12, 2013, ICN'13.
Nadeem Javaid, "Analysis and design of quality link metrics for routing protocols in Wireless Networks", PhD Thesis Defense, Dec. 15, 2010, Universete Paris-Est.
English Translation of Office Action in counterpart Chinese Application No. 201510671892.2, dated Sep. 25, 2019, 10 pages.

\* cited by examiner

ADJACENCY TABLE 400

| SOURCE NODE | NEIGHBORS | REACHABLE NETWORKS |
|---|---|---|
| NODE C | NODE B | 122 |
|  | NODE D | 122 |
|  | NODE E | 120, 122 |
|  | NODE F |  |

ADJACENCY TABLE 410

| SOURCE NODE | NEIGHBORS | REACHABLE NETWORKS |
|---|---|---|
| NODE D | NODE B | 122 |
|  | NODE C | 122 |
|  | NODE E | 120, 122 |
|  | NODE F |  |

ADJACENCY TABLE 420

| SOURCE NODE | NEIGHBORS | REACHABLE NETWORKS |
|---|---|---|
| NODE E | NODE A | 120 |
|  | NODE B | 122 |
|  | NODE C | 122 |
|  | NODE D | 122 |
|  | NODE F |  |

ADJACENCY TABLE 430

| SOURCE NODE | NEIGHBORS | REACHABLE NETWORKS |
|---|---|---|
| NODE F | NODE C | 122 |
|  | NODE D | 122 |
|  | NODE E | 120, 122 |

FIG. 4

FACE TABLE 500

| SOURCE NODE | VIRTUAL INTERFACE | MEMBER NEIGHBORS | REACHABLE NETWORKS |
|---|---|---|---|
| NODE C | FACE 1 | NODE B | 122 |
|  |  | NODE C |  |
|  | FACE 2 | NODE C |  |
|  |  | NODE D |  |
|  |  | NODE E |  |
|  |  | NODE F |  |
|  | FACE 3 | NODE C | 120 |
|  |  | NODE E |  |
|  | FACE 4 | NODE C | 122 |
|  |  | NODE D |  |
|  |  | NODE E |  |

FACE TABLE 510

| SOURCE NODE | VIRTUAL INTERFACE | MEMBER NEIGHBORS | REACHABLE NETWORKS |
|---|---|---|---|
| NODE D | FACE 1 | NODE B | 122 |
|  |  | NODE D |  |
|  | FACE 2 | NODE C |  |
|  |  | NODE D |  |
|  |  | NODE E |  |
|  |  | NODE F |  |
|  | FACE 3 | NODE D | 120 |
|  |  | NODE E |  |
|  | FACE 4 | NODE C | 122 |
|  |  | NODE D |  |
|  |  | NODE E |  |

FIG. 5A

FACE TABLE 520

| SOURCE NODE | VIRTUAL INTERFACE | MEMBER NEIGHBORS | REACHABLE NETWORKS |
|---|---|---|---|
| NODE E | FACE 1 | NODE A | 120 |
| | | NODE E | |
| | FACE 2 | NODE B | 122 |
| | | NODE E | |
| | FACE 3 | NODE C | |
| | | NODE D | |
| | | NODE E | |
| | | NODE F | |
| | FACE 4 | NODE C | 122 |
| | | NODE D | |
| | | NODE E | |

FACE TABLE 530

| SOURCE NODE | VIRTUAL INTERFACE | MEMBER NEIGHBORS | REACHABLE NETWORKS |
|---|---|---|---|
| NODE F | FACE 1 | NODE C | 122 |
| | | NODE D | |
| | | NODE E | |
| | | NODE F | |
| | FACE 2 | NODE E | 120 |
| | | NODE F | |

FIG. 5B

SYSTEM AND METHOD FOR CREATING VIRTUAL INTERFACES BASED ON NETWORK CHARACTERISTICS

CROSS-REFERENCE TO RELATED APPLICATIONS

This application is a continuation of U.S. patent application Ser. No. 14/522,479, filed Oct. 23, 2014, the entirety of which is incorporated herein by reference.

BACKGROUND

This disclosure is generally related to computer networks. More specifically, this disclosure is related to a network node that creates a virtual interface based on network and/or device characteristics for a set of mutual-listener devices that have a duplex communication with each other.

RELATED ART

Ad-hoc and multi-hop wireless networks allow mobile devices to communicate with remote devices outside their wireless range, without requiring a fixed network infrastructure. These mobile devices can modify their local network topology as new devices enter their coverage area, or as other devices leave their coverage area. Also, each wireless device can communicate with another device that is outside its direct coverage area by using a path that traverses various network peers.

Some devices in a wireless ad-hoc network have one or more wireless interfaces, such as a Wi-Fi radio or a Bluetooth radio, to communicate with other neighboring devices within its broadcast range. These devices can create a logical interface for each wireless interface, which includes one or more neighbors that the device can communicate with via the wireless interface.

In a Content Centric Network (CCN), a CCN node is not allowed to forward a packet via the same interface that it received the packet. However, it is possible that some of the neighboring devices accessible via the logical interface may not be within each other's broadcast range. Hence, if the CCN node needs to forward a packet between two neighboring nodes, the CCN node may need to forward the packet via the same logical interface that was used to receive the packet, which can have the undesired effect of creating a forwarding loop.

To make matters worse, not all neighbors accessible via a logical interface may be gateways to the some sets of remote network nodes. Hence, forwarding a packet via the logical interface may result in forwarding the packet to a set of neighbors that cannot reach the packet's intended recipient.

SUMMARY

One embodiment provides a network-configuring system that creates stable virtual interfaces for groups of neighboring nodes. During operation, the system can obtain network-neighborhood information from one or more network neighbors. This network-neighborhood information includes duplex-neighborhood information that indicates at least a set of neighboring devices to the network neighbor, and a set of remote network nodes which are accessible via a respective neighbor. The system can use the network-neighborhood information to determine one or more groups of network neighbors with common network characteristics, such that a respective group includes one or more mutually-connected network peers. The system can then define a virtual interface for a respective group of stable network neighbors, such that the virtual interface's member nodes include the local network node and the respective group's mutually-connected network peers.

In some embodiments, the local network node includes a network node of a Content Centric Network (CCN). In CCN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms describe elements of a CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components pare, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. Pat. No. 9,978,025, entitled "ORDERED-ELEMENT NAMING FOR NAME-BASED PACKET FORWARDING," which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across CCN, which CCN routers can propagate toward a storage device (e.g., a cache server) or a data producer that can provide the requested data to satisfy the request or Interest.

A description of a CCN architecture is described in U.S. Pat. No. 9,456,054, entitled "CONTROLLING THE SPREAD OF INTERESTS AND CONTENT IN A CONTENT CENTRIC NETWORK," which is hereby incorporated by reference.

In some embodiments, member network nodes of a respective virtual interface include multiple network neighbors which communicate with the local network node via a common physical or virtual interface of the local network node.

In some variations to these embodiments, the multiple network neighbors include a stable set of network neighbors that communicate with the local network node via a persistent network connection over the common physical or virtual interface of the local network node.

In some embodiments, the network-neighborhood information for a respective network node can include connectivity information for the respective network node, and indication as to whether the respective network node is a gateway to a remote network, and/or a pre-exiting configuration for the respective network node. The network-neighborhood information can also include routing information, link characteristics, a pre-existing link characteristic, historical connectivity information, and/or predicted connectivity information.

In some embodiments, member network nodes of a respective virtual interface include a network neighbor which communicates with the local network node via physical interface or virtual interface for a personal area network (PAN).

In some variations to these embodiments, the physical or virtual interface for the PAN includes a Bluetooth interface, a wireless optical communication interface, a line-of-sight communication interface, and/or a wireless universal serial bus (USB) interface.

In some embodiments, the system can monitor network packets transmitted by one or more neighboring network nodes. If the system determines that a network neighbor has left a network neighborhood of the local network node, the system determines a virtual interface associated with the determined network neighbor, and removes the determined network neighbor from the determined virtual interface.

In some embodiments, the system can monitor network packets transmitted by one or more neighboring network nodes. If the system determines that a network neighbor has entered a network neighborhood of the local network node, the system creates a new virtual interface for the determined network neighbor.

In some embodiments, the system can receive updated network-neighborhood information from one or more network neighbors. If the system determines that a network neighbor's network characteristics has changed based on the updated network-neighborhood information, the system determines whether the determined network neighbor's network characteristics is compatible with that of a virtual interface to which the network interface belongs. If the system determines that the determined network neighbor's network characteristics is not compatible with that of the virtual interface, the system can remove the network neighbor from the virtual interface, and creates a new virtual interface for the determined network neighbor.

BRIEF DESCRIPTION OF THE FIGURES

FIG. 4 illustrates exemplary adjacency tables for a set of mutual-listener network nodes in accordance with an embodiment.

FIGS. 5A-5B illustrates virtual interface definitions at various network nodes in accordance with an embodiment.

In the figures, like reference numerals refer to the same figure elements.

DETAILED DESCRIPTION

Figure 1:
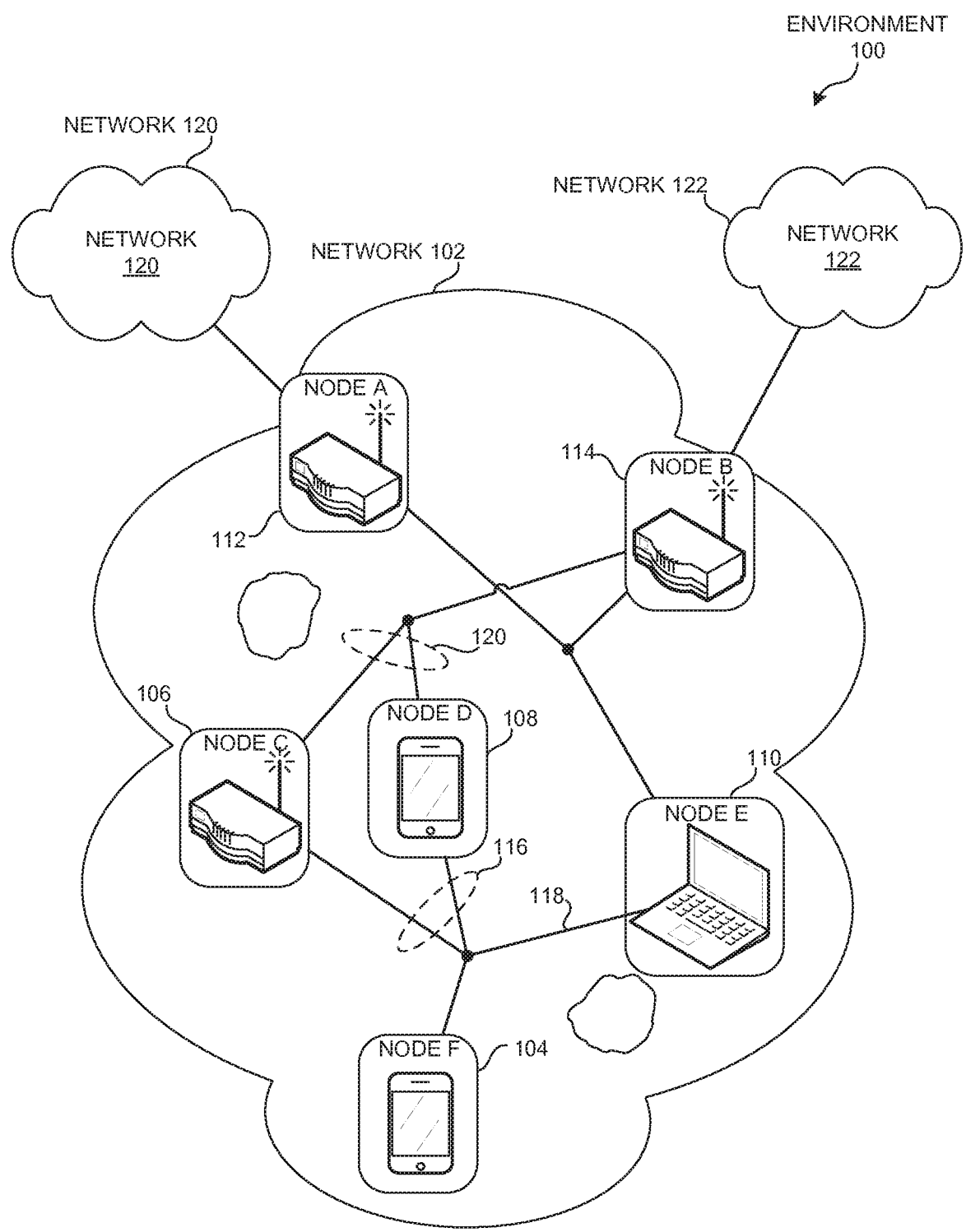
FIG. 1 illustrates an exemplary network environment that facilitates forwarding network packets based on characteristics of the available virtual interfaces in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a network-configuring system that solves the problem of creating one or more stable virtual interfaces based on various network characteristics. For example, a network node can include various physical interfaces, such as Wi-Fi, Bluetooth, and/or Ethernet, that each allows the network node to interface with various network neighbors. However, in a content centric network (CCN), a CCN node is not allowed to forward a packet via a face (e.g., a physical interface or virtual interface) from which it received the packet as a way to avoid forwarding loops. Hence, the network-configuring system can define a virtual interface to include a group of duplex neighbors that can listen to each other's packets (hereinafter referred to as mutual-listener network nodes) to avoid having to forward a packet to a member of the virtual interface.

In some embodiments, the system selects the mutual listeners that are grouped for a virtual interface based on the network characteristics of a physical or virtual interface, and/or the characteristics of the mutual-listener nodes. This allows the system to generate the virtual interfaces that include stable groups of mutual listeners to avoid having to modify a virtual interface once it has been created.

Also, the system can configure how it uses the network's topology by defining the virtual interfaces based on the various network characteristics. This allows the system to make forwarding decisions for a packet by picking a virtual interface that is most suitable for the packet. Possible types of network characteristics can include:

1) The types of physical interface used to connect to each neighboring node.
2) A connection stability to each neighboring node.
3) The network neighborhood for each neighboring node.
4) Other networks or remote network nodes that are reachable via each neighboring node.

For example, the network node can configure a set of virtual interfaces to its neighboring nodes so that each virtual interface satisfies one or more of the following criteria:

1) Neighbors in each virtual face communicate with the local node via the same underlying physical or virtual interface.
2) Neighbors in each virtual face are mutual listeners.
3) Neighbors in each virtual face are stable neighbors whose connection state doesn't change (otherwise these unstable neighbors need to be in their own face).
4) Neighbors in each virtual interface forward Interests to the same network(s). They need to be assigned to their own face if they can forward to or reach a different remote network.

Using this criteria, the network node can create one virtual interface for an infrastructure network (e.g., infrastructure Wi-Fi), given that in an infrastructure Wi-Fi network, all members of the Wi-Fi network are expected to be mutual listeners. The network node can create another virtual interface for a broadcast-based Ethernet network, again, because all members of the broadcast-based Ethernet network are expected to be mutual listeners.

However, in a personal area network (PAN) where nodes can go in and out of the network (e.g., over Bluetooth), the network node can assign a virtual interface for each neighboring node accessible via the PAN. This ensures that each virtual interface built on top of the PAN is stable for as long as the corresponding neighboring node is within the PAN. For example, a Bluetooth interface doesn't provide a wide coverage area, which can cause the network node to temporarily lose connection to the neighboring nodes it connects to over Bluetooth. If the local network node were to create a virtual interface for multiple neighbors of a PAN interface, the network node (or another node of the virtual interface) would need to redefine the virtual interface each time another member of the virtual interface leaves or re-enters the PAN neighborhood. However, because the system assigns a virtual interface to each neighboring node of the PAN interface, the local network node just needs to create or tear down the virtual interface to each individual PAN neighbor that enters or leaves the PAN neighborhood, without modifying the definition for virtual interfaces to the other PAN neighbors.

In some embodiments, the network node can treat an unstable broadcast network (e.g., an ad-hoc Wi-Fi network, or a Bluetooth network) as a collection of point-to-point links. Also, the network node can create a virtual interface for each point-to-point link, regardless of the physical interface or virtual interface via which the link is established. This allows the network node to create a new dedicated virtual interface for each new or unstable neighbor that enters (or re-enters) the network node's network neighborhood, without having to modify a definition for an existing virtual interface. Then during operation, the network node just sees the virtual interfaces to these devices when they're available, and is not concerned with the underlying physical interfaces over which these virtual interfaces are established.

For example, if the network node is a part of an ad-hoc network, the network node may create and destroy point-to-point virtual interfaces as neighbors come in and out of the ad-hoc network (e.g., over a Wi-Fi network). The network node may create an "adhoc face 1" virtual interface to one neighbor over the Wi-Fi physical interface, and may create an "adhoc face 2" virtual interface to a different neighbor over the Wi-Fi physical interface. As a further example, the network node can also create a virtual interface for each point-to-point link over any other physical channel, such as over Bluetooth, or via an Internet Protocol (IP) tunnel or Virtual Private Network (VPN) tunnel that may have been established over Ethernet. The network node uses each of these point-to-point links or tunnels as a dedicated virtual interface to the other endpoint of the point-to-point link or tunnel.

Exemplary Network Environment

FIG. 1 illustrates an exemplary network environment 100 that facilitates forwarding network packets based on characteristics of the available virtual interfaces in accordance with an embodiment. Computer environment 100 can include a plurality of network nodes that communicate over a shared network 102, which can be realized over one or more physical network interfaces. In some embodiments network 102 includes a Content Centric Network (CCN), and network nodes 104-114 include CCN devices.

During operation, the network nodes of network 102 can form an ad-hoc or multi-hop wireless network by each node dynamically creating and tearing down virtual interfaces over one or more physical interfaces as necessary. More specifically, each network node can automatically detect a set of neighboring nodes, and clusters these neighboring nodes based on various network characteristics to generate a virtual interface for each cluster. This allows each network node to autonomously create a virtual interface without having to explicitly negotiate the member nodes of the virtual interface with other network nodes of network 102.

For example, network nodes 104, 106, 108, and 110 may have a direct duplex network connection with each other. Also, network nodes 106 and 108 may have a direct duplex network connection with a network node 114 that provides access to another network 122. Network node 110 can also have a direct duplex network connection with network node 114, as well as a network node 112 that provides access to a network 120. In some embodiments, these devices of network 102 can exchange duplex-neighborhood information with each other (e.g., an adjacency table) that identifies a network device's set of neighboring nodes, and the other networks to which they can provide access either directly or indirectly.

Because network nodes 104, 106, 108, and 110 can listen to each other over network 102, they are able to obtain duplex-neighborhood information from each other. Network nodes 102, 104, 106, and 108 can each independently analyze each other's duplex-neighborhood information to determine that they can form a group of mutual listeners. However, network nodes 106 and 108 both have a different network reachability than network node 110, because network nodes 106 and 108 can only provide access to network 122, while network node 110 can provide access to networks 120 and 122. Hence, network node 104 creates a virtual interface 116 for network nodes 106 and 108 (that provide access to network 122), and creates another virtual interface 118 for network node 110 (that provides access to networks 120 and 122). This ensures that each virtual interface includes a set of mutual-listener mutual-network nodes that have a stable duplex network connection with each other (e.g., have mutual-listener relationship) and provide access to the same remote networks (e.g., have mutual-network relationship).

Once the network nodes of network 102 have created one or more virtual interfaces, they can use their local virtual interfaces to forward packets across network 102 without sending the packet to any member node of the virtual interface from which the packet was received. For example, network node 114 can communicate a packet that is directed toward network devices 106 and 108, and whose header includes an identifier for a virtual interface 120. Network device 106 can receive the packet from device 114, and if device 106 is not the intended target for the packet, forwards the packet to its neighbors. Device 106 analyzes the packet's header to determine that the packet arrived through virtual interface 120, that device 108 has already received the packet from device 114 given that virtual interface 120 includes devices {106, 108, 114} that can each receive each other's packets. Device 106 then proceeds to forward the packet to device 104 via virtual interface 116, and includes an identifier for virtual interface 116 in the packet's header to prevent the packet from flowing back to device 108.

In some embodiments, network node 104 can forward a packet to a target network by selecting a virtual interface associated with the target network. For example, if network node 104 needs to forward a packet to network 120, network node 104 can perform a lookup in a virtual interface table to select a virtual interface associated with network 120. After determining that virtual interface 118 provides access to network 120, device 104 can include interface 118 in the packet's header, and proceeds to forward the packet via virtual interface 118.

Figure 2:
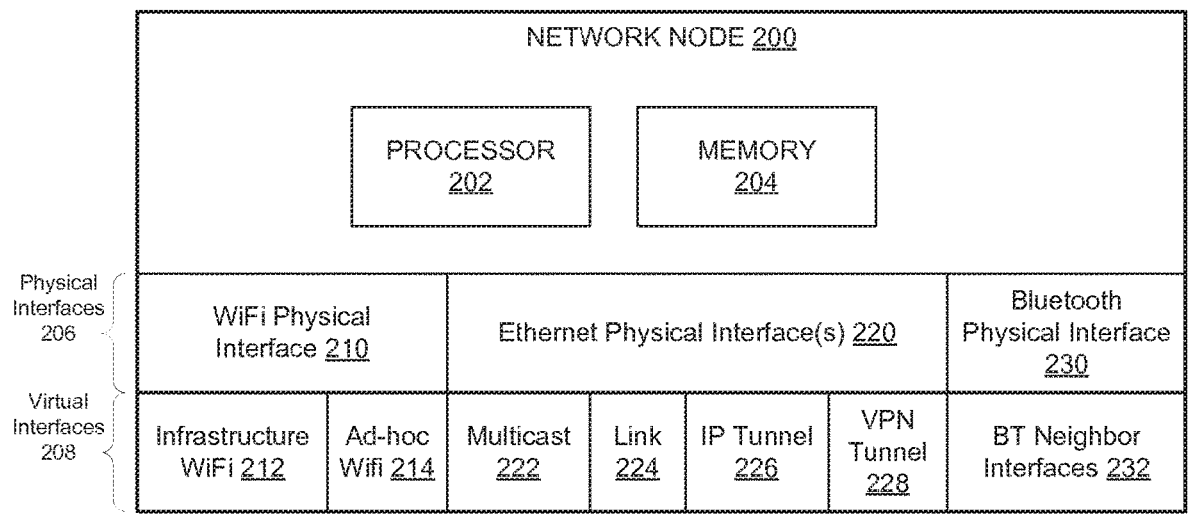
FIG. 2 illustrates an exemplary network node in accordance with an embodiment.

FIG. 2 illustrates an exemplary network node 200 (e.g., a CCN device) in accordance with an embodiment. Network node 200 can include a processor 202, a memory 204, and a set of physical interfaces 206. Physical interfaces 206 can include, for example, a Wi-Fi physical interface 210, one or more Ethernet physical interfaces 220, a Bluetooth physical interface 230, and/or any other physical interfaces now known or later developed.

Network node 200 can also include one or more virtual interfaces 208, which are established on top of an existing physical interface or virtual interface. Virtual interfaces 208 can include an Infrastructure Wi-Fi virtual interface 212 and/or an ad-hoc Wi-Fi virtual interface 214 established over Wi-Fi physical interface 210. Virtual interfaces 208 can include one or more virtual interfaces established over one or more Ethernet physical interface(s) 220, such as a multicast virtual interface 222, a link interface 224, an Internet Protocol (IP) tunnel 226, and/or a Virtual Private Network (VPN) virtual interface 228. Virtual interfaces 208 can also include a Bluetooth neighbor interface 232 for each neighbor with which network node 200 has paired. Network node 200 establishes each Bluetooth neighbor interface 232 as a virtual interface on top of Bluetooth physical interface 230.

In some embodiments, network node 200 can create a virtual interface on top of an existing virtual interface. For example, network node 200 can create a "link" virtual interface 224 over one or more Ethernet physical interfaces 220, and can create one or more other virtual interfaces over link 224. As another example, network node 200 can create a virtual interface for a multicast address of a "multicast channel," on top of link virtual interface 224.

Establishing Stable Virtual Interfaces

In some embodiments, the system creates a virtual interface for groups of nodes that provide a connection to a common set of remote network nodes or remote networks (e.g., for nodes that behave as a gateway to a VPN, or the Internet). The local network node can leverage gateway-specific virtual interfaces to control which network nodes or remote networks receive a packet (e.g., an Interest packet) by forwarding the packet via a corresponding virtual interface. For example, the network node may be coupled to two gateways that provide access to the Internet, where one gateway provides a better channel to one Internet service (e.g., Amazon.com) and the other gateway provides a better channel to another Internet service (e.g., NYTimes.com). The network node can determine which gateways provide a suitable connection to a remote network or service based on one or more predetermined performance criteria, such as network latency, security, and/or network reliability.

Hence, the network node can configure how it sees and interacts with the network topology by creating a set of virtual faces based on network characteristics. For example, while the network node may communicate with the two services over multiple neighboring nodes (e.g., gateways), the network node can analyze network characteristics to determine which neighboring nodes serve as a suitable gateway to the remote network or service. The network node can generate a virtual interface for the remote network or service so that the virtual interface includes the network nodes that provide a connection to the remote network or service.

In some embodiments, the network node considers the reachability of its neighbors when determining whether to group multiple mutual-listening neighbors into a single face. If two mutual-listening neighbors can forward Interests to different networks, the local network node assigns a different face to each of these two neighbors, even though they are mutual listeners. However, if the two neighbors are mutual listeners and can provide a suitable network connection to the same target networks, the network node can group these two neighbors into a single face, since the network node can use either of these two neighbors to reach the same target networks.

In some embodiments, the network node can create one virtual interface for each of the local gateways, and creates another virtual interface for the entire broadcast domain (e.g., the full set of mutual-listening neighbors of a physical interface). This creates a dedicated virtual interface for each gateway, even though it's possible for the gateways to belong to the face for the entire broadcast domain. This allows the network node to select an explicit gateway to use via its face, without having the Interest reach an unintended gateway. The other gateways will ignore the Interest since it was not sent via a face to which they belong.

Figure 3:
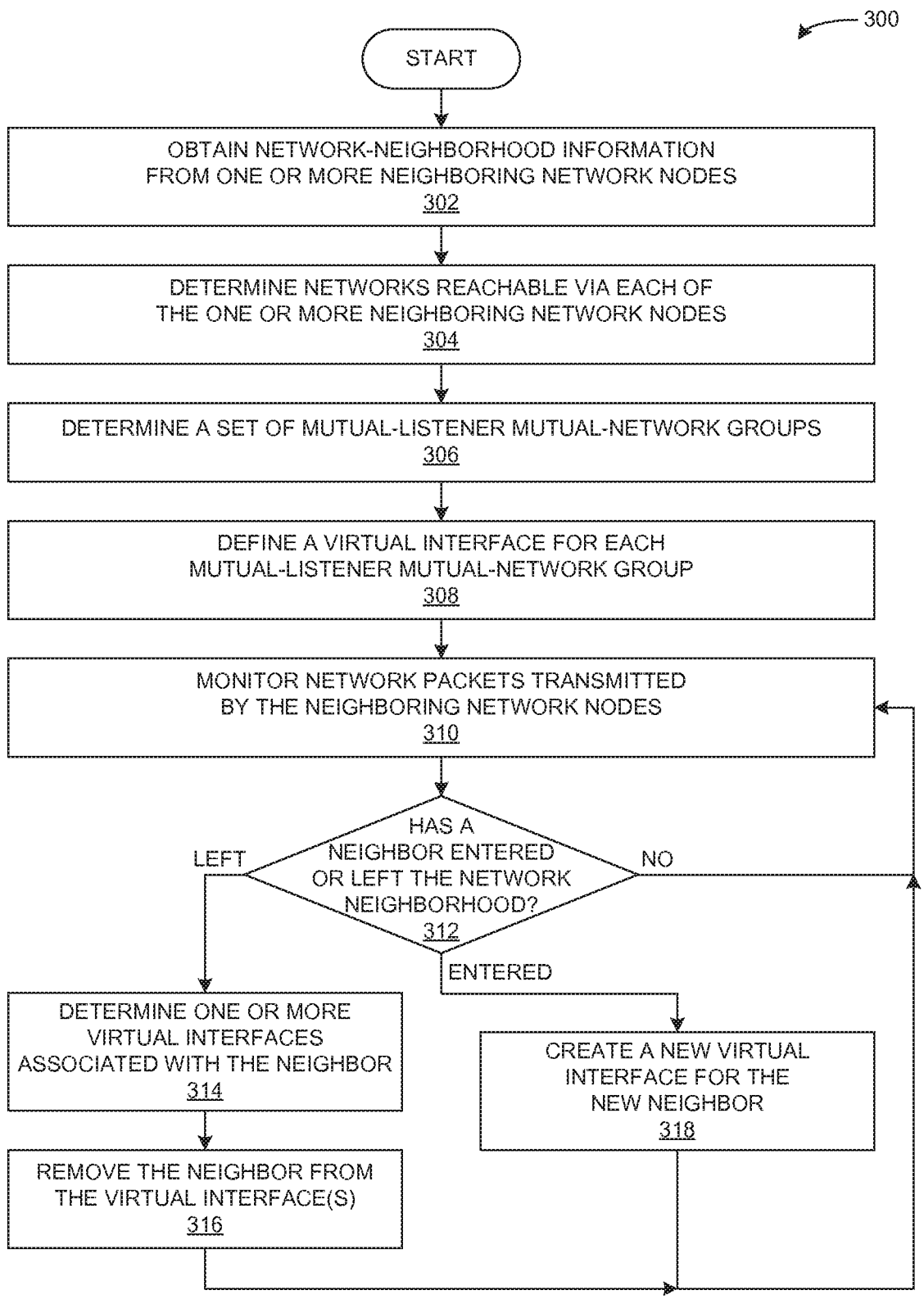
FIG. 3 presents a flow chart illustrating an exemplary method for defining one or more virtual interfaces that each includes a set of mutual-listener mutual-network neighbors in accordance with an embodiment.

FIG. 3 presents a flow chart illustrating an exemplary method 300 for defining one or more virtual interfaces that each includes a set of mutual-listener mutual-network neighbors in accordance with an embodiment. During operation, the network node can obtain network-neighborhood information from one or more neighboring network nodes (operation 302). This network-neighborhood information can include, for example, connectivity information for a network node, and indication as to whether the network node is a gateway to a remote network, and/or a pre-exiting configuration for the respective network node. The network-neighborhood information can also include routing information, link characteristics, a pre-existing link characteristic, historical connectivity information, and/or predicted connectivity information.

The network node can analyze the network-neighborhood information to determine networks reachable via each of the one or more neighboring network nodes (operation 304), and to determine a set of mutual-listener mutual-network groups (operation 306). Each mutual-listener mutual-network groups includes one or more neighboring nodes that can communicate with each other over a physical interface (e.g., are mutual listeners), and provide a connection to the same set of remote networks or network nodes (e.g., are mutual-network neighbors). The network node then defines a virtual interface for each mutual-listener mutual-network group (operation 308).

Recall that the network node creates each virtual interface to include a stable set of neighboring mutual-listener nodes. In some embodiments, the network node can manage the set of virtual interfaces when network neighbors enter or leave the network node's network neighborhood. For example, the network node can monitor network packets transmitted by the neighboring network nodes (operation 310), and determines whether a neighbor has entered or left the network node's network neighborhood (operation 312).

If a neighbor has not entered or left the network neighborhood, the network node can return to operation 310 to continue monitoring packets transmitted in the network neighborhood. However, if a network neighbor has left the network neighborhood, the network node can determine one or more virtual interfaces associated with this neighbor (operation 314), and removes the neighbor from these virtual interfaces (operation 316). If the neighbor was the only network node of a virtual interface, the network node can tear down the virtual interface.

On the other hand, if a new neighbor has entered the network node can create a new virtual interface for the new neighbor (operation 318). Note that it may be possible for the new neighbor to be incorporated into an existing virtual interface, (e.g., the new node may be a mutual-listener mutual-network neighbor of the other nodes in the virtual interface). However, in some embodiments, the network node may not add the new neighbor to an existing virtual interface while the network node does not know how stable the connection is to new neighbor. The new neighbor may be a mobile computing device that changes location often, or may have a weak signal to the other nodes in the virtual interface that causes the new network node to lose connection to the network node or the other nodes of the virtual interface. Rather, the network node may periodically re-evaluate the various virtual interfaces to merge multiple virtual interfaces that have compatible definitions (e.g., with compatible mutual-listener neighbors and compatible network characteristics).

In some embodiments, the network node can repeat operations 302-308 periodically to re-define mutual-listener mutual-network groups that are expected to have stable neighboring nodes. This way, if the new neighbor that was detected during operation 312 happens to be a stable neighbor, the network node can add this new neighbor to the virtual interface that includes the other mutual-listener mutual-network neighbors. The network node can determine that the new neighbor is a stable neighbor, for example, by requiring an up-time for a connection to the new neighbor to be at least equal to a predetermined minimum up-time threshold. Alternatively or additionally, the network node can determine that a new neighbor is a stable neighbor when an administrator designates the neighbor as a stable neighbor.

FIG. 4 illustrates exemplary adjacency tables for a set of mutual-listener network nodes in accordance with an embodiment. Specifically, Nodes C, D, E, and F of FIG. 1 are mutual listener nodes over a common physical channel. Adjacency table 400 for Node C indicates that Node C has neighbors Nodes B, D, E, and F, such that Node C can reach a network 120 via Node E, and can reach a network 122 via Nodes B, D, and E. Adjacency table 410 for Node D indicates that Node D has neighbors Nodes B, C, E, and F, and that Node D can reach network 120 via Node E, and can reach network 122 via Nodes B, C, and E. Adjacency table 420 for Node E indicates that Node E has neighbors Nodes A, B, C, D, E, and F, such that Node E can reach network 120 via Node A, and can reach network 122 via Nodes B, C, and D.

In some embodiments, Node F can receive adjacency tables 400, 410, and 420 from its neighboring nodes C, D, and E, respectively, and uses these adjacency tables to determine which networks Node F can reach via Nodes C, D, and E. Node F uses this information to generate adjacency table 430, which indicates that Node F has neighbors Nodes C, D, and E, and that Node F can reach network 120 via Node E, and can reach network 122 via Nodes C, D, and E.

Note that nodes C, D, E, and F are mutual listeners, given that adjacency tables 400, 410, 420, and 430 include nodes C, D, E, and F as either a source node or a neighbor. The network nodes can create a virtual interface for the list of mutual-listener neighbors, and can also create a virtual interface for each group of mutual-listener neighbors that serve as a bridge to a remote network (or a predetermined target network node). For example, Node C may create one virtual interface for all mutual-listener neighbors (Nodes C, D, E, and F), and may create a virtual interface for each network accessible via these neighbors (e.g., networks 120 and 1220). The virtual interface for network 120 can include neighboring nodes D and E, but does not include node B since node B is not a mutual listener of the node group {C, D, E, F}. The virtual interface for network 122 can include neighboring node E, the only neighboring node that can serve as a bridge to network 120. As a further example, Node F may create one virtual interface for network 122 that includes the full set of mutual-listener neighboring nodes (e.g., Nodes C, D, and E), and may create a second virtual interface for network 120 that includes node E.

FIGS. 5A and 5B illustrate virtual interface definitions at various network nodes in accordance with an embodiment. Specifically, each face table can include a set of columns that specify network information associated with a virtual interface definition. A "source node" column specifies the network node that generated the virtual interface, and a "virtual interface" column specifies a name for the virtual interface created by the source node. The column "member neighbors" specifies one or more neighboring network nodes that are members of the virtual interface, and the column "reachable network" specifies one or more networks that are reachable via the virtual interface. For example, a column entry that includes a network "120" indicates that any member neighbor of the virtual interface can be used to access the network named "120." In some embodiments, the reachable network can include a named network (e.g., a Virtual Private Network (VPN), the Internet, etc.) or can include a group of one or more remote network nodes (e.g., a Web page, an Internet service, etc.) associated with a CCN name or name prefix (e.g., a routable prefix). Moreover, each face table can also include additional columns to specify additional attributes of a virtual interface, such as a performance metric (e.g., a minimum and/or maximum bandwidth, a minimum and/or maximum round trip delay, a minimum and/or maximum security rating, etc.).

Face table 500 specifies that Node C created a virtual interface "Face 1" for neighbor Node B, and created a second virtual interface "Face 2" for mutual-listener neighbors Node D, Node E, and Node F. Node C also created additional virtual interfaces for each mutual-listener mutual-network group: virtual interface "Face 3" includes Node E that connects to network 120, and virtual interface "Face 4" includes mutual-listener neighboring nodes Node D and Node E that both provide a connection to network 122. Similarly, face table 510 from Node D includes a virtual interface "Face 1" for Node B, includes a virtual interface "Face 2" for the mutual-listener group, includes a virtual interface "Face 3" for the mutual-listener node that provides a connection to network 120 (e.g., Node E), and includes a virtual interface "Face 4" for the mutual-listener nodes that provide a connection to network 122 (e.g., Node C and Node E).

Face table 520 includes a virtual interface "Face 1" for neighbor Node A that provide a connection to network 120, and includes another virtual interface for Node B that provides a connection to network 122. Table 520 also includes a virtual interface "Face 3" for the mutual-listener nodes Node C, Node D, and Node F. Also, since mutual-listener nodes Node C and Node D provide a connection to network 122, Node E created a virtual interface "Face 4" for network 122 that includes neighbors Node C and Node D.

In some embodiments, Node F can use adjacency tables 400, 410, and 420 to generate face table 530. Specifically, face table 530 includes a virtual interface "Face 1" that includes the mutual-listener neighbors Node B, Node C, and Node D. Also, since these mutual-listener neighbors also provide a connection to network 122, Node F can generate face table 530 to specify that Face 1 is associated with network 122. Moreover, since Node E also provides a connection to network 120, Node F can generate another virtual interface "Face 2" that includes Node E as a gateway to network 120.

In some embodiments, a network node can update its face table that defines the virtual interfaces available at the network node. This allows the network node to drop an unstable neighbor from a virtual interface for a set of mutual-listener neighbors, and allows the network node to generate a new virtual interface for a new neighbor or a neighbor with an unstable connection.

Figure 6:
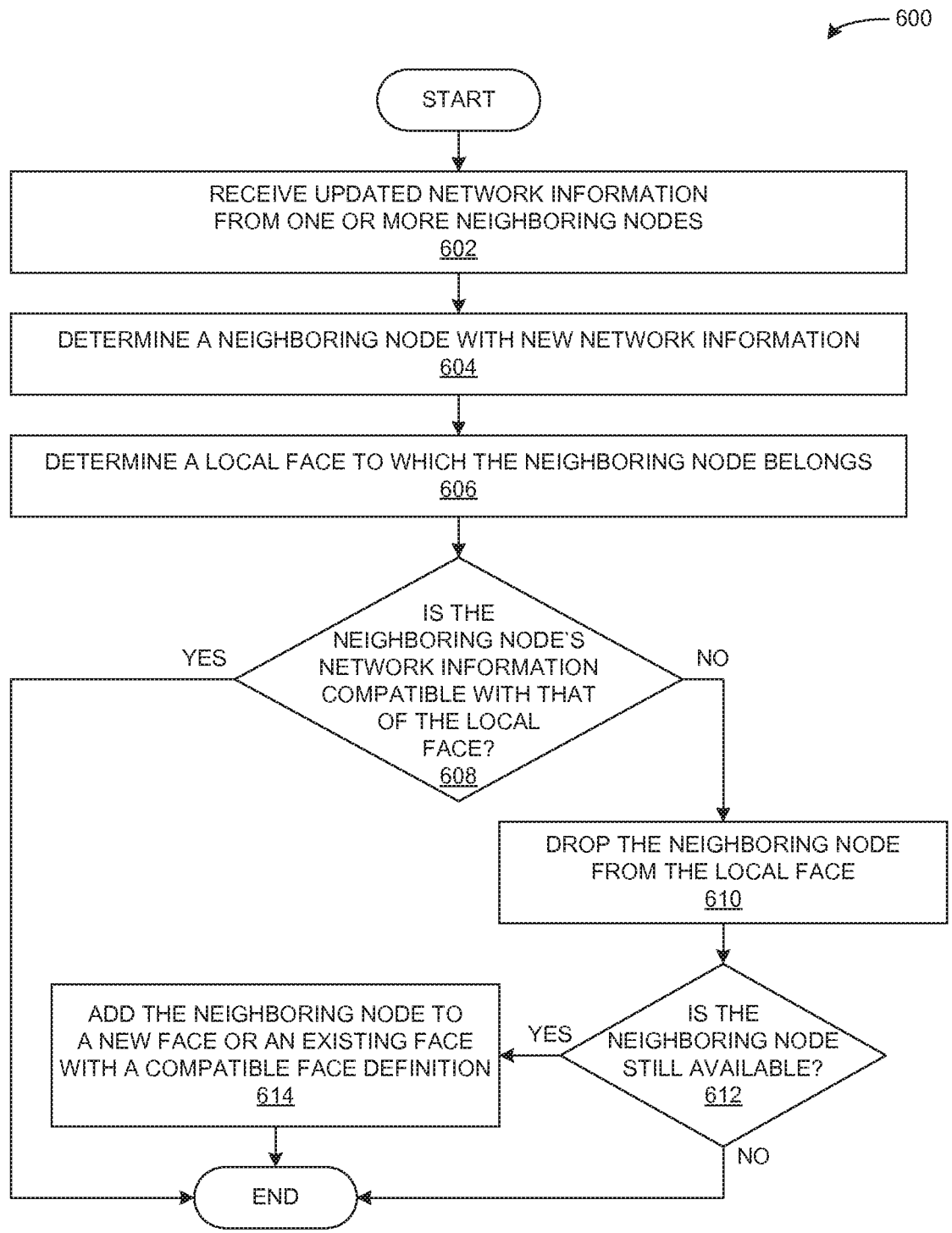
FIG. 6 presents a flow chart illustrating an exemplary method for updating a virtual interface definition in accordance with an embodiment.

FIG. 6 presents a flow chart illustrating an exemplary method 600 for updating a virtual interface definition in accordance with an embodiment. During operation, the network node can receive updated network information from one or more neighboring nodes (operation 602). This network information can include, for example, adjacency tables, network performance metrics, or any other information that quantifies the performance and security of the neighboring nodes and/or the network connection thereto.

The network node then determines a neighboring node with new network information (operation 604), and determines a local face (e.g., a virtual interface) to which the neighboring node belongs (operation 606). This network node can include, for example, a network node that has left or entered the local network neighborhood, has new reachability information (e.g., is a gateway to a different set of remote nodes or networks), or whose network connection to the local network node has changed. The network connection to the neighboring network node may change when the network connection has degraded (e.g., becomes an unstable network connection) or upgraded (e.g., becomes stable), when the network connection to the local network node has changed to a different physical interface, or when the network node or the network connection thereto has new network performance metrics.

The network node then determines whether the neighboring node's network information is compatible with the face's definition. For example, the network node can determine the network information associated with the neighboring node from adjacency tables received from the neighboring node and/or any other node. The network node can also determine the face's definition from the network node's face table, and compares this with the network information for the neighboring node. If the neighboring node's network information is not compatible with the face's definition, the network node can drop the neighboring node from the face (operation 610), for example, by updating the face table to exclude the neighboring node from the face.

Also, the network node can determine whether the neighboring node is still available (operation 612), and if so, adds the neighboring node to a new face or an existing face whose face definition is compatible with the network information for the neighboring node (operation 614).

In some embodiments, the network node can receive a packet via a physical interface, and processes the packet if the packet was transmitted over a virtual interface to which the network node is a member.

Figure 7:
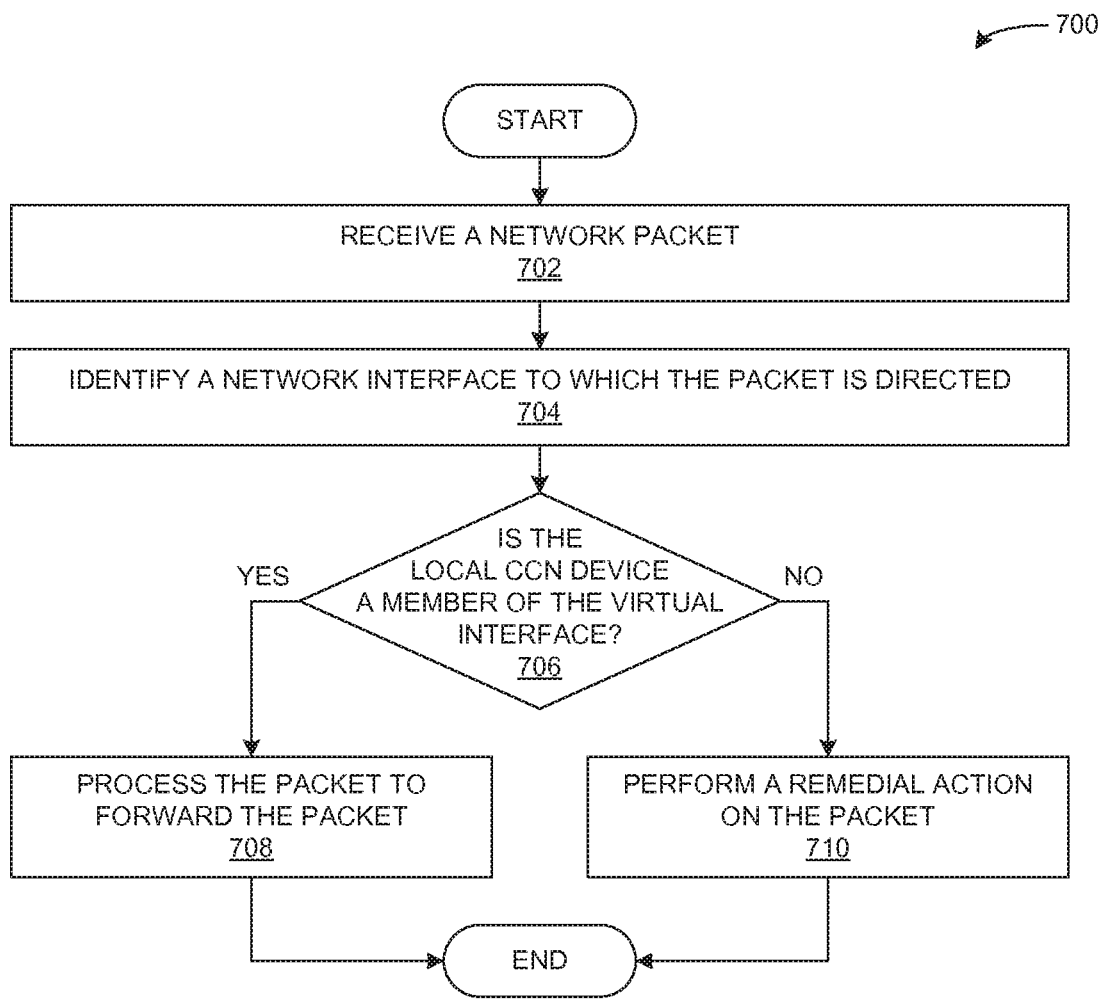
FIG. 7 presents a flow chart illustrating an exemplary method for processing a network packet at a network node in accordance with an embodiment.

FIG. 7 presents a flow chart illustrating an exemplary method 700 for processing a network packet at a network node in accordance with an embodiment. During operation, the network node can receive a network packet (operation 702), and identifies a network interface to which the packet is directed (operation 704). For example, the network packet can include a virtual-interface identifier that specifies a set of device identifiers for one or more network devices that belong to a mutual-listener group. Alternatively, the virtual-interface identifier can include a hash of the set of device identifiers, or can include a bloom filter that was generated based on the set of device identifiers.

The network node then determines whether it is a member of the identified virtual interface (operation 706). For example, if the virtual-interface identifier includes a set of device identifiers, the local network node can determine whether the network node is a member of the interface by determining whether the network node's identifier is included in the set of device identifiers. On the other hand, if the virtual-interface identifier includes a hash value for the set of device identifiers, the local network node can use the hash value to perform a lookup on a table of candidate virtual interfaces. If the local network node finds a match, the network node can conclude that the network node is a member of the packet's virtual interface. The network node can also use the matching entry to determine a set of neighboring network nodes that are members of the virtual interface. On the other hand, if the virtual-interface includes a bloom filter, the local network node can query the bloom filter using device identifiers found in the duplex-neighborhood information for the local network node, as well as for all neighboring nodes. The device identifiers that result in a hit on the bloom filter correspond to the set of network nodes that are members of the virtual interface identified by the packet.

If the network node is a member of the identified virtual interface, the network node can proceed to process the packet as an intended recipient for the packet (operation 708). For example, network node may include a CCN node, and the packet can include a CCN Interest or Content Object. If the network packet includes an Interest, the network node can perform a lookup operation on a Forwarding Information Base (FIB) to determine another virtual interface to use to forward the Interest packet. On the other hand, if the packet includes a Content Object, the network node can perform a lookup operation on a Pending Interest Table (PIT) to determine another virtual interface to use to forward the Content Object. The network node can also perform other operations on the packet, such as to cache the packet's payload (e.g., a Content Object).

On the other hand, if the local network node is not a member of the virtual interface identified in the packet's header, the network node can perform a remedial action (operation 710). The remedial action can include, for example, ignoring the packet, or caching the packet's payload (e.g., without forwarding the packet). The remedial action can also include using the virtual-interface identifier in the packet's header to update duplex-neighborhood information for the neighboring node that sent the packet.

Figure 8:
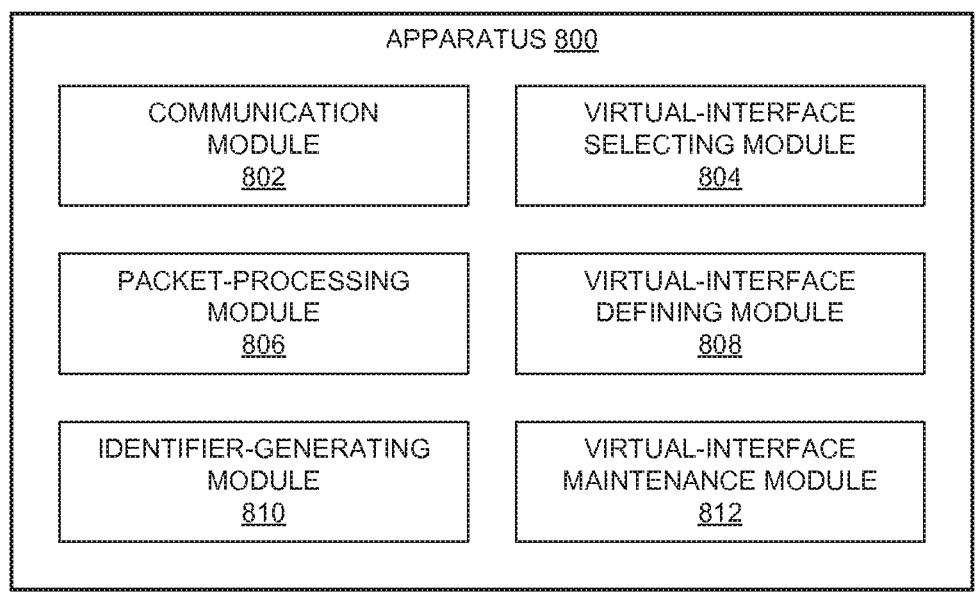
FIG. 8 illustrates an exemplary apparatus that facilitates forwarding network packets based on characteristics of the available virtual interfaces in accordance with an embodiment.

FIG. 8 illustrates an exemplary apparatus 800 that facilitates forwarding network packets based on characteristics of the available virtual interfaces in accordance with an embodiment. Apparatus 800 can comprise a plurality of modules which may communicate with one another via one or more physical network interfaces. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a communication module 802, a virtual-interface selecting module 804, a packet-processing module 806, a virtual-interface defining module 808, an identifier-generating module 810, and a virtual-interface maintenance module 812.

In some embodiments, communication module 802 can receive a packet, and virtual-interface selecting module 804 can determine whether the local network device is a member of the virtual interface. Packet-processing module 806 can process the packet in response to determining that the local network device is a member of the virtual interface.

Virtual-interface defining module 808 can define one or more virtual interfaces based on duplex-neighborhood information and network characteristics received from one or more network neighbors, and identifier-generating module 810 can generate an interface identifier for a respective virtual interface. Virtual-interface maintenance module 812 can monitor packets transmitted by one or more network peers to detect a change in a network neighborhood and/or a change in network characteristics of the network neighborhood, and activates a new virtual interface or modifies an existing virtual interface to account for the detected change.

Figure 9:
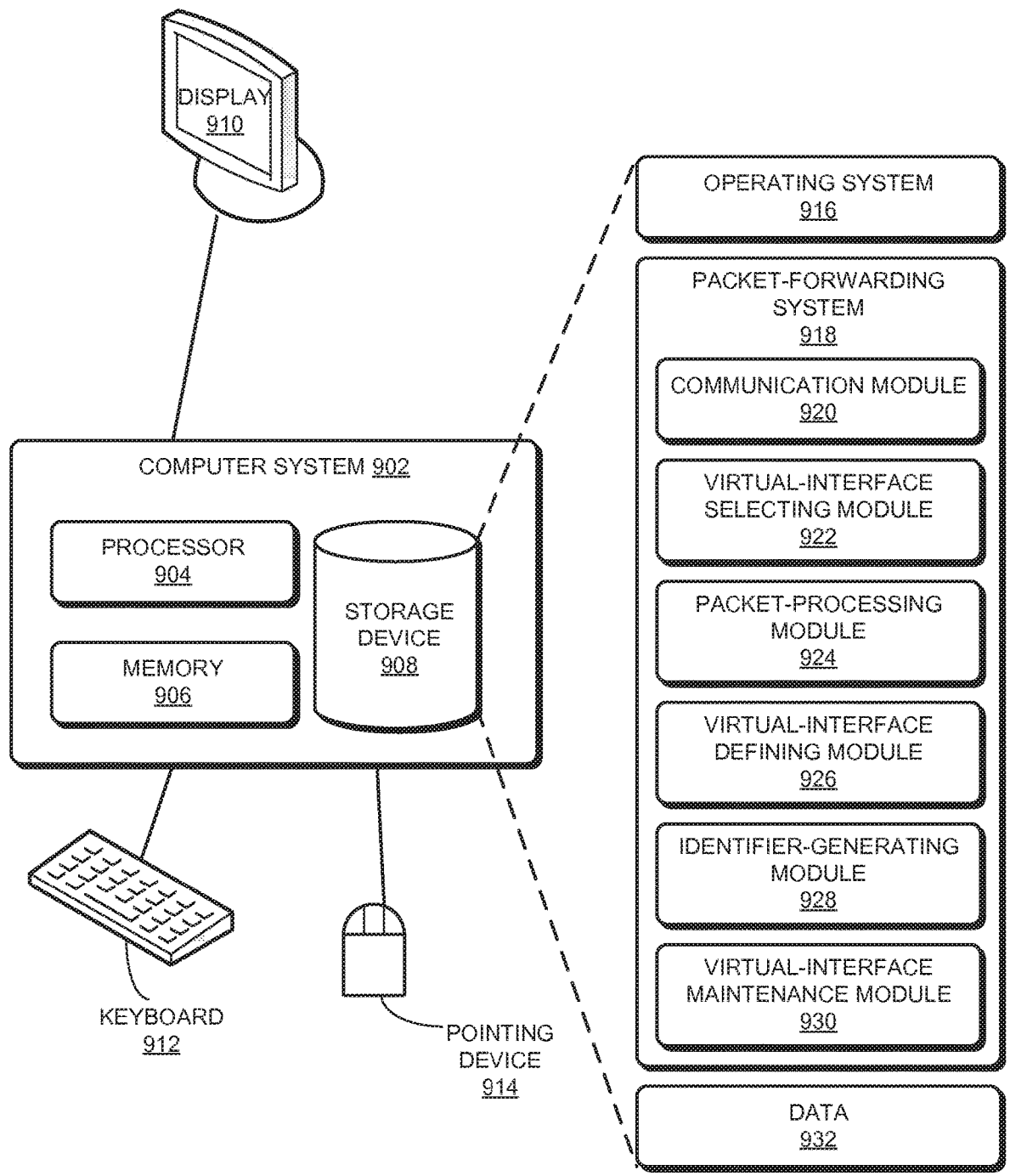
FIG. 9 illustrates an exemplary computer system that facilitates forwarding network packets based on characteristics of the available virtual interfaces in accordance with an embodiment.

FIG. 9 illustrates an exemplary computer system 902 that facilitates forwarding network packets based on characteristics of the available virtual interfaces in accordance with an embodiment. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store operating system 916, an interface-maintenance system 918, and data 932.

Interface-maintenance system 918 can include instructions, which when executed by computer system 902, can cause computer system 902 to perform methods and/or processes described in this disclosure. Specifically, interface-maintenance system 918 may include instructions for receiving a packet (communication module 920). Further, interface-maintenance system 918 can include instructions for determining whether the local network device is a member of the virtual interface (virtual-interface selecting module 922), and can include instructions for processing the packet in response to determining that the local network device is a member of the virtual interface (packet-processing module 924).

Interface-maintenance system 918 can include instructions for defining one or more virtual interfaces based on duplex-neighborhood information and network characteristics received from one or more network neighbors (virtual-interface defining module 926), and can include instructions for generating an interface identifier for a respective virtual interface (identifier-generating module 928). Interface-maintenance system 918 can also include instructions for monitoring packets transmitted by one or more network peers to detect a change in a network neighborhood and/or a change in network characteristics of the network neighborhood, and activating a new virtual interface or modifies an existing virtual interface to account for the detected change (virtual-interface maintenance module 930).

Data 932 can include any data that is required as input or that is generated as output by the methods and/or processes described in this disclosure. Specifically, data 932 can store at least identifiers for one or more virtual interfaces, and duplex-neighborhood information (e.g., adjacency tables) for a set of neighboring network nodes, and face tables that define one or more virtual interfaces for computer system 902.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
   obtaining, by a local network node, network-neighborhood information from one or more network neighbors of the local network node, wherein the network-neighborhood information includes duplex-neighborhood information that indicates at least a set of neighboring devices to a network neighbor, and a set of remote network nodes accessible via a respective network neighbor;
   determining, based on the network-neighborhood information, a first group of the network neighbors having first common network characteristics, wherein the first group of the network neighbors includes first mutually-connected network peers;
   defining, by the local network node, a first virtual interface for the first group of network neighbors, wherein member nodes of the first virtual interface include the local network node and the first mutually-connected network peers;
   determining, based on the network-neighborhood information, a second group of the network neighbors having second common network characteristics different from the first common network characteristics, wherein the second group of the network neighbors includes second mutually-connected network peers; and
   defining, by the local network node, a second virtual interface, different from the first virtual interface, for the second group of network neighbors, wherein member nodes of the second virtual interface include the local network node and the second mutually-connected network peers.

2. The method of claim 1, wherein member nodes of a respective virtual interface include multiple network neighbors which communicate with the local network node via a common physical or virtual interface of the local network node.

3. The method of claim 2, wherein the multiple network neighbors include a set of network neighbors that communicate with the local network node via a persistent network connection over the common physical or virtual interface of the local network node.

4. The method of claim 1, wherein the network-neighborhood information for a respective network node can include at least one of:
   connectivity information for the respective network node;
   whether the respective network node is a gateway to a remote network;
   a pre-exiting configuration for the respective network node;
   routing information;
   link characteristics;
   a pre-existing link characteristic;
   historical connectivity information; or
   predicted connectivity information.

5. The method of claim 1, wherein member nodes of a respective virtual interface include at least one of the one or more network neighbors which communicates with the local network node via a physical interface or virtual interface for a personal area network.

6. The method of claim 5, wherein the physical or virtual interface for the personal area network includes at least one of:
   a Bluetooth interface;
   a wireless optical communication interface;
   a line-of-sight communication interface; or
   a wireless universal serial bus interface.

7. The method of claim 1, further comprising:
   monitoring network packets transmitted by the one or more network neighbors;
   determining that one of the one or more network neighbors has left a network neighborhood of the local network node;
   determining a virtual interface associated with the determined network neighbor that has left the network neighborhood of the local network node; and
   removing the determined network neighbor from the determined virtual interface.

8. The method of claim 1, further comprising:
   monitoring network packets transmitted by the one or more network neighbors;
   determining that a network neighbor has entered a network neighborhood of the local network node; and
   creating a new virtual interface for the determined network neighbor.

9. The method of claim 1, further comprising:
   receiving updated network-neighborhood information from the one or more network neighbors;
   determining, from the updated network-neighborhood information, that a network neighbor's network characteristics has changed; and
   responsive to determining that the determined network neighbor's network characteristics are not compatible with that of a virtual interface to which the determined network neighbor belongs:
      removing the determined network neighbor from the virtual interface; and
      creating a new virtual interface for the determined network neighbor.

10. A non-transitory computer-readable storage medium storing instructions that when executed by a computer cause the computer to perform a method, the method comprising:
   obtaining network-neighborhood information from one or more network neighbors of a local network node, wherein the network-neighborhood information includes duplex-neighborhood information that indicates at least a set of neighboring devices to a network neighbor, and a set of remote network nodes accessible via a respective network neighbor;
   determining, based on the network-neighborhood information, a first group of the network neighbors having first common network characteristics, wherein the first group of the network neighbors includes first mutually-connected network peers;
   defining a first virtual interface for the first group of network neighbors, wherein member nodes of the first virtual interface include the local network node and the first mutually-connected network peers;
   determining, based on the network-neighborhood information, a second group of the network neighbors having second common network characteristics different from the first common network characteristics, wherein the second group of the network neighbors includes second mutually-connected network peers; and
   defining a second virtual interface, different from the first virtual interface, for the second group of network neighbors, wherein member nodes of the second virtual interface include the local network node and the second mutually-connected network peers.

11. The non-transitory computer-readable storage medium of claim 10, wherein member nodes of a respective virtual interface include multiple network neighbors which communicate with the local network node via a common physical or virtual interface of the local network node.

12. The non-transitory computer-readable storage medium of claim 11, wherein the multiple network neighbors include a set of network neighbors that communicate with the local network node via a persistent network connection over the common physical or virtual interface of the local network node.

13. The non-transitory computer-readable storage medium of claim 10, wherein the method further comprises:
   monitoring network packets transmitted by the one or more network neighbors;
   determining that one of the one or more network neighbors has left a network neighborhood of the local network node;
   determining a virtual interface associated with the determined network neighbor that has left the network neighborhood of the local network node; and
   removing the determined network neighbor from the determined virtual interface.

14. The non-transitory computer-readable storage medium of claim 10, wherein the method further comprises:
   monitoring network packets transmitted by the one or more network neighbors;
   determining that a network neighbor has entered a network neighborhood of the local network node; and
   creating a new virtual interface for the determined network neighbor.

15. The non-transitory computer-readable storage medium of claim 10, wherein the method further comprises:
   receiving updated network-neighborhood information from the one or more network neighbors;
   determining, from the updated network-neighborhood information, that a network neighbor's network characteristics has changed; and
   responsive to determining that the determined network neighbor's network characteristics are not compatible with that of a virtual interface to which the determined network neighbor belongs:
      removing the determined network neighbor from the virtual interface; and
      creating a new virtual interface for the determined network neighbor.

16. A computer system comprising:
   one or more processors; and
   a memory, coupled to the one or more processors, storing instructions that, when executed by the one or more processors, cause the computing system to perform a method comprising:
      obtaining network-neighborhood information from one or more network neighbors of a local network node, wherein the network-neighborhood information includes duplex-neighborhood information that indicates at least a set of neighboring devices to a network neighbor, and a set of remote network nodes accessible via a respective network neighbor;
      determining, based on the network-neighborhood information, a first group of the network neighbors having first common network characteristics, wherein the first group of the network neighbors includes first mutually-connected network peers;
      defining a first virtual interface for the first group of network neighbors, wherein member nodes of the first virtual interface include the local network node and the first mutually-connected network peers;
      determining, based on the network-neighborhood information, a second group of the network neighbors having second common network characteristics different from the first common network characteristics, wherein the second group of the network neighbors includes second mutually-connected network peers; and
      defining a second virtual interface, different from the first virtual interface, for the second group of network neighbors, wherein member nodes of the second virtual interface include the local network node and the second mutually-connected network peers.

17. The computer system of claim 16, wherein member nodes of a respective virtual interface include multiple network neighbors which communicate with the local network node via a common physical or virtual interface of the local network node.

18. The computer system of claim 16, wherein the method further comprises:
   monitoring network packets transmitted by the one or more network neighbors;
   determining that one of the one or more network neighbors has left a network neighborhood of the local network node;
   determining a virtual interface associated with the determined network neighbor that has left the network neighborhood of the local network node; and
   removing the determined network neighbor from the determined virtual interface.

19. The computer system of claim 16, wherein the method further comprises:
   monitoring network packets transmitted by the one or more network neighbors;
   determining that a network neighbor has entered a network neighborhood of the local network node; and
   creating a new virtual interface for the determined network neighbor.

20. The computer system of claim 16, wherein the method further comprises:
   receiving updated network-neighborhood information from the one or more network neighbors;
   determining, from the updated network-neighborhood information, that a network neighbor's network characteristics has changed; and
   responsive to determining that the determined network neighbor's network characteristics are not compatible with that of a virtual interface to which the determined network neighbor belongs:
      removing the determined network neighbor from the virtual interface; and
      creating a new virtual interface for the determined network neighbor.

* * * * *